United States Patent [19]

Stahl

[11] 4,297,877
[45] Nov. 3, 1981

[54] FORCE MEASURING HUB

[75] Inventor: Reinhard Stahl, Wolfsburg, Fed. Rep. of Germany

[73] Assignee: Volkswagenwerk AG, Wolfsburg, Fed. Rep. of Germany

[21] Appl. No.: 107,579

[22] Filed: Dec. 27, 1979

[30] Foreign Application Priority Data

Dec. 28, 1978 [DE] Fed. Rep. of Germany ....... 2856453

[51] Int. Cl.³ .............................................. G01L 5/16
[52] U.S. Cl. .................................. 73/146; 73/862.04
[58] Field of Search .................. 73/133 R, 136 C, 146

[56] References Cited

U.S. PATENT DOCUMENTS 3,728,896 4/1973 Sheldon et al. .................. 73/136 C
4,023,404 5/1977 Brendel ............................ 73/133 R

FOREIGN PATENT DOCUMENTS 2302540 7/1974 Fed. Rep. of Germany.

Primary Examiner—Charles A. Ruehl
Attorney, Agent, or Firm—Spencer & Kaye

[57] ABSTRACT

A force measuring hub for a wheel supported on a carrier has a first annular component adapted for a coaxial attachment to the wheel and provided with a plurality of radial webs having elongation-sensing strips and a second annular component adapted for a coaxial attachment to the carrier and being operatively coupled to the first annular component such that the radial webs lie in a force path passing between the wheel and the carrier. The first annular component is a flat disc comprising an inner zone adapted to be secured to the wheel and an outer rim surrounding the inner zone. The radial webs are arranged in a single plane between the inner zone and the outer rim. The first annular component further has a plurality of extensions attached to the outer rim and oriented radially inwardly therefrom. The extensions are located in the above-noted single plane in respective spaces defined between adjoining radial webs. Each extension terminates at a clearance from the inner zone. The second annular component is also disc-shaped and includes mounting projections extending into respective clearances between the inner zone and the respective extension of the first annular component.

3 Claims, 2 Drawing Figures

FORCE MEASURING HUB

BACKGROUND OF THE INVENTION

This invention relates to a force measuring hub to measure forces and/or torques exerted at least in the circumferential direction on a body such as a wheel, particularly a vehicle wheel. The force measuring hub has a first annular component which is adapted to be coaxially mounted on the wheel-like body and which has radial webs provided with elongation-sensing strips, forming part, for example, of a bridge circuit. The force measuring hub further has a second annular component which is adapted to be coaxially mounted on a carrier for the wheel-like body, such as a braking device and is connected with the first component such that the radial webs are situated in the force path passing between the wheel and the carrier.

A force measuring hub of the above-outlined type is known and is disclosed, for example, in German Laid-Open Application (Offenlegungsschrift) No. 2,302,540. In this known force measuring hub the two annular components are connected with one another and have angled cross-sectional shapes. The first annular component has a cylindrical portion situated within the hub and further has, at an end face, an outwardly oriented securing flange to be mounted on a vehicle wheel. The second annular component of the force measuring hub has an external cylindrical portion and, at an end thereof, an inwardly oriented securing flange which serves for mounting the force measuring hub on a brake drum. Between the two cylindrical portions there extend radial webs which are arranged in two planes and which are provided with elongation-sensing strips.

The above-outlined known force measuring hub has a substantial spatial requirement in the axial direction. For this reason, in order to compensate for the axial dimension of the force measuring hub with regard to the track width of the vehicle, the vehicle wheel proper has to be removed and replaced by a particularly dimensioned measuring wheel.

SUMMARY OF THE INVENTION

It is an object of the invention to provide an improved force measuring hub of the above-outlined type which has substantially reduced dimensions in the axial direction and therefore does not need a particular measuring wheel. At the same time, the force measuring hub according to the invention is to preserve all the advantages of known force measuring hubs, particularly their universal applicability-with a flat adapter, if necessary-in different vehicle wheels.

This object and others to become apparent as the specification progresses, are accomplished by the invention, according to which, briefly stated, the above-discussed first annular component is a flat disc which has the configuration of a spoked wheel and in which are radial webs extend in a single plane between an external rim and inner zone of the first annular component. The inner zone serves for securement to a wheel-like body exposed to the forces to be measured. The external rim carries, in the plane between the radial webs, radially inwardly oriented extensions whose ends are at a distance from the inner zone. The earlier-discussed second annular component is also a disc-shaped member which has mounting projections extending into the clearance between the inner zone on the one hand and the radially inwardly extending projections, on the other hand.

According to a preferred embodiment of the invention, the force measuring hub has—without additional structural parts—a safety arrangement which projects the force measuring hub against overload.

Thus, it is an important characteristic of the invention that all "active" components of the force measuring hub extend in a single plane transversely to the axis of the wheel-like body to be tested which, in the preferred field of application, is a wheel of a vehicle. The structural arrangement according to the invention ensures that, coupled with the disc-shaped configuration of the second annular component, the force measuring hub has a minimum dimension in the axial direction.

DESCRIPTION OF THE PREFERRED EMBODIMENT

Figure 1:
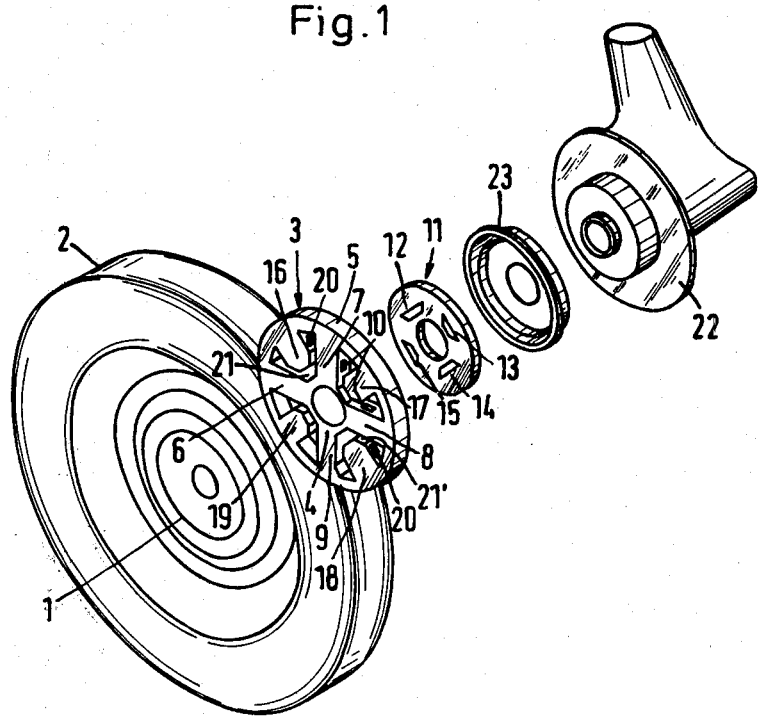
FIG. 1 is a perspective exploded view of a preferred embodiment of the invention.

Turning now to FIG. 1, with a vehicle wheel 1, on which there is mounted a tire 2, there is connected, for example by means of bolts, a disc-shaped first annular component 3 of a force measuring hub. The first component 3 has, in this embodiment, a total of four radial webs 6, 7, 8 and 9 situated between an inner zone 4 and an outer rim 5 of the component 3. The webs 6–9 are provided with conventional elongation-sensing strips 10.

The force measuring hub further has a second disc-shaped annular component 11 which carries four mounting projections 12, 13, 14 and 15 which, in the assembled state, extend into the plane of the first annular component 3. The mounting projections 12 through 15 are connected, for example by welds, with respective extensions 16, 17, 18 and 19 which form part of the first annular component 3 and which project radially inwardly from the outer rim 5. The extensions 16–19 which are provided with elongation-sensing strips 20, terminate at a distance 21 from the inner zone 4 of the first annular component 3. The distance 21 defines a clearance for receiving the mounting projections 12–15 of the disc-shaped second annular component 11.

The disc-shaped component 11 is, for its attachment to a braking device 22, provided with an adapter 23, by means of which the universally useable force measuring hub can be adapted to the particular conditions in a particular vehicle wheel.

Figure 2:
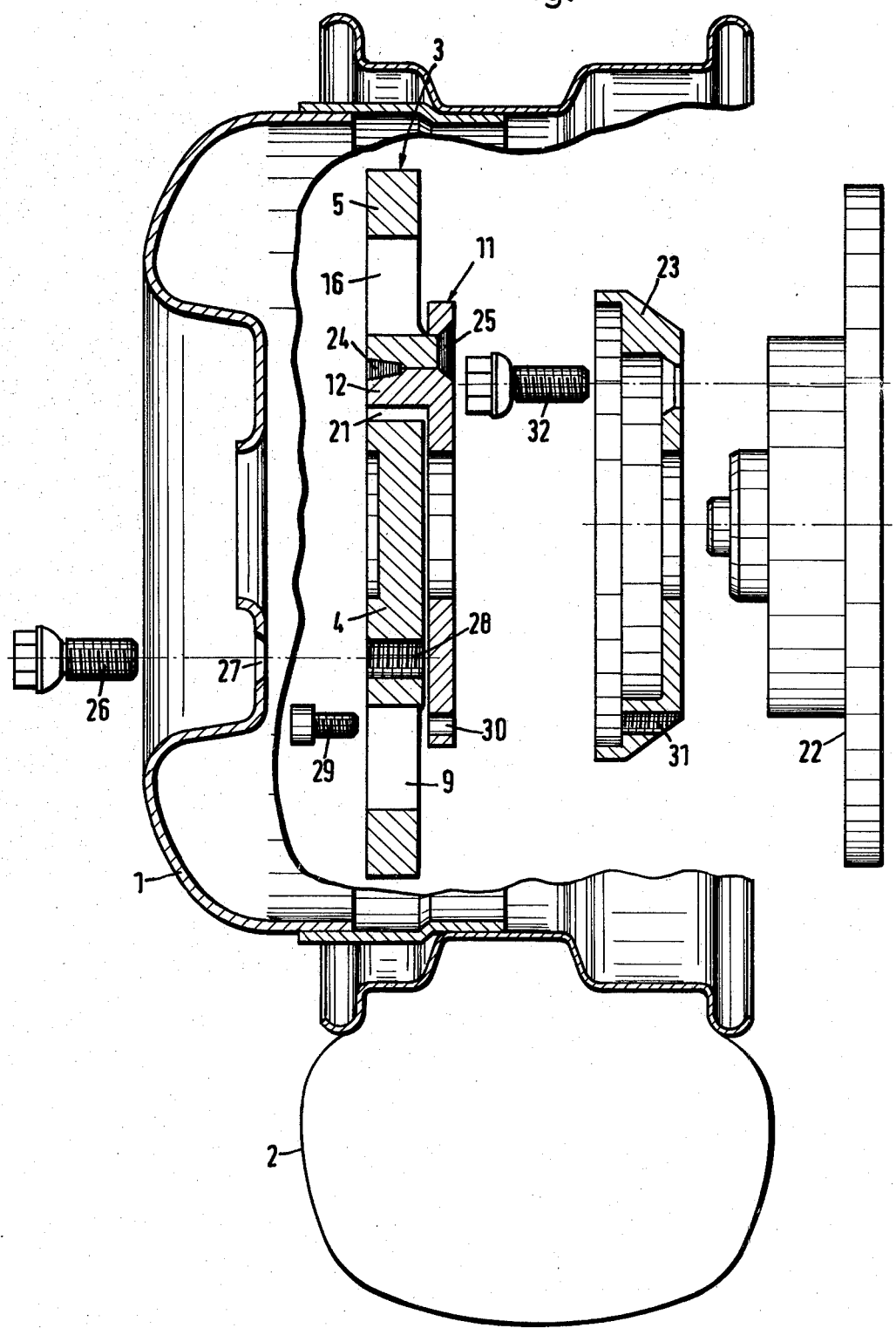
FIG. 2 is an enlarged exploded axial sectional view of the same embodiment.

Turning now to FIG. 2, the disc-shaped components 3 and 11 are shown in their assembled and welded condition, otherwise the force measuring hub is shown in an exploded view. Bolts 26 serve for tightening the first component 3 to the wheel 1. For this purpose the bolts 26 are passed through openings 27 in the wheel 1 and are threaded into threaded holes 28 provided in the first component 3. The adapter 23 is mounted on the second disc-shaped component 11 by means of screws 29 which pass through holes 30 of the component 11 and are threaded into threaded holes 31 provided in the adapter 23. The latter, in turn, is mounted on the braking device 22 by means of screws 32. All connecting means between the force measuring hub and the vehicle wheel or the braking device are thus releasable screw connections.

Between the oblique lateral faces of the projection 12 on the one hand and the adjoining radial webs of the first component 3 on the other hand, there is provided a relatively narrow clearance 21'. Corresponding clearances can be found in the zone of the other projections as well. The width of each clearance 21' is so dimensioned that in case of a predetermined maximum deformation of the radial webs 6-9 and the projections 16-19, the clearance disappears so that, as a result, the components which otherwise define a gap are now in engagement with one another. Upon such an occurrence, larger forces or torques are no longer transmitted by means of the elongation-sensing strips of the force measuring hub. This preferred embodiment thus has, without additional structural parts, a safety arrangement which protects the force measuring hub against overload.

It will be understood that the above description of the present invention is susceptible to various modifications, changes and adaptations, and the same are intended to be comprehended within the meaning and range of equivalents of the appended claims.

What is claimed is:

1. In a force measuring hub for measuring forces and/or torques acting in at least the circumferential direction of a wheel-like body supported on a carrier, the force measuring hub including a first annular component adapted for a coaxial attachment to the wheel-like body; the first annular component further having a plurality of radial webs provided with elongation-sensing strips; a second annular component adapted for a coaxial attachment to the carrier; connecting means for operatively coupling the second annular component and the first annular component such that the radial webs lie in a force path passing between the wheel-like body and the carrier; the improvement wherein said first annular component is a flat disc comprising an inner zone adapted to be secured to the wheel-like body and an outer rim surrounding said inner zone; said radial webs being arranged in a single plane between said inner zone and said outer rim; said first annular component further comprising a plurality of extensions attached to said outer rim and oriented radially inwardly therefrom in said single plane into respective spaces defined between adjoining said radial webs; each said extension terminating at a clearance from said inner zone; said second annular component being disc-shaped and including mounting projections extending into respective clearances between said inner zone and the respective extension of said first annular component.

2. A force measuring hub as defined in claim 1, wherein said first and second annular components are in a coaxial, adjoining relationship with respect to one another and further wherein each said mounting projection of said second annular component is secured to a respective said extension of said first annular component; the securement between said first and second annular components being comprised in said connecting means.

3. A force measuring hub as defined in claim 1, wherein each said radial web is situated at a circumferentially measured distance from adjoining said extensions; said distance being reduced to zero upon exceeding a predetermined magnitude of deformation of said radial webs and said extensions.

* * * * *